United States Patent
Goto et al.

(10) Patent No.: US 6,591,577 B2
(45) Date of Patent: Jul. 15, 2003

(54) AUTOMOBILE DOOR REINFORCING MEMBER

(75) Inventors: Hiroshi Goto, Soja (JP); Haruyoshi Iogawa, Soja (JP); Hiroshi Yoshida, Soja (JP); Masahiro Kyoto, Soja (JP)

(73) Assignee: OM Corporation, Okayama (JP)

( * ) Notice: Subject to any disclaimer, the term of this patent is extended or adjusted under 35 U.S.C. 154(b) by 0 days.

(21) Appl. No.: 09/898,848

(22) Filed: Jul. 3, 2001

(65) Prior Publication Data

US 2002/0000077 A1 Jan. 3, 2002

(30) Foreign Application Priority Data

Jul. 3, 2000 (JP) ..................................... P2000-200788

(51) Int. Cl.$^7$ .................................................. B60J 5/00
(52) U.S. Cl. .................. 52/735.1; 52/731.6; 296/146.6; 138/115
(58) Field of Search .................. 52/735.1, 731.2, 52/731.6, 732.1; 296/146.6, 188; 138/115, 177

(56) References Cited

U.S. PATENT DOCUMENTS

| | | | | |
|---|---|---|---|---|
| 4,948,196 A | * | 8/1990 | Baba et al. ................. | 296/149 |
| 5,080,427 A | * | 1/1992 | Sturrus et al. ............ | 296/146.6 |
| 5,306,058 A | * | 4/1994 | Sturrus et al. ............ | 293/154 |
| 5,580,120 A | * | 12/1996 | Nees et al. ............... | 296/146.6 |
| 5,756,167 A | * | 5/1998 | Tamura et al. ............ | 296/189 |
| 5,813,718 A | * | 9/1998 | Masuda et al. ........... | 296/146.6 |
| 5,813,719 A | * | 9/1998 | Kowalski ................. | 296/146.6 |
| 5,820,202 A | * | 10/1998 | Ju ........................... | 296/146.6 |
| 5,992,922 A | * | 11/1999 | Harbig et al. ............ | 296/146.6 |
| 6,020,039 A | * | 2/2000 | Cline et al. .............. | 296/146.6 |
| 6,332,302 B1 | * | 12/2001 | Asai ........................ | 296/146.6 |

FOREIGN PATENT DOCUMENTS

| | | | | |
|---|---|---|---|---|
| JP | 407025239 A | * | 1/1995 | |
| JP | 07-215059 |   | 8/1995 | |
| JP | 407215059 A | * | 8/1995 | |
| JP | 08-216684 | * | 8/1996 | |
| JP | 08-244456 | * | 9/1996 | |
| JP | 09-086172 | * | 3/1997 | |
| JP | 09-141368 | * | 6/1997 | |
| JP | 410058973 A | * | 3/1998 | |
| JP | 11-059181 | * | 3/1999 | |
| JP | 411207424 A | * | 8/1999 | |
| JP | 02000238536 A | * | 9/2000 | |

* cited by examiner

*Primary Examiner*—Anita King
(74) *Attorney, Agent, or Firm*—Koda & Androlia (57) ABSTRACT

An automobile reinforcing member wherein a pair of pipes are formed relatively from an original sheet material with a joint surface in a middle portion of the original sheet in a width direction, the fold-back faces consist of the outer side faces of the pipes extending laterally from said joint surface, the outer wall faces extending from said outer side faces of the pipes, the inner side faces of the pipes extending from said outer wall faces, the inner wall faces extending from said fold-back faces to the joint surface, and the welding portions extending from said inner wall faces. These portions are formed into lateral pipes by bending the fold-back faces, folding boundary mark between the inner wall face and the welding portion into valley-shaped, and putting those welding portions onto the joint surface situated at interval between said pipes, and then welding both of welding portions and the joint surface together to form an integrated structure.

6 Claims, 11 Drawing Sheets

AUTOMOBILE DOOR REINFORCING MEMBER

BACKGROUND OF THE INVENTION

1. Field of the Invention

The present invention relates to an automobile door reinforcing member being arranged inside of an automobile door, so as to protect passengers in the vehicle by absorbing impact in the collision from a side face.

2. Description of the Related Art

A strict safety level for automobiles provides a built-in type of the automobile door reinforcing members, such as the side beam or the impact protection beam. For these automobile door reinforcing members, there are many proposals to achieve miniaturization, lightening, high strengthening on demand. For instance, these are shown in U.S. Pat. Nos. 5,580,120, 5,813,718, 5,820,202, 5,992,922 and U.S. Pat. No. 6,020,039 in the United States, furthermore, in Japanese Patent Application Laid-Open No. 216684/1996, No. 141368/1997, No. 215059/1995, No. 244456/1996, and No. 086172/1997.

The purpose of an automobile door reinforcing member is to protect passengers by absorbing impact in the collision from a side face. In order to achieve the purpose mentioned above, there are integral formed products such as formed by processing an original sheet or formed by transforming a pipe cross-section. By providing greater numbers of pipes and more complicated structures of pipe cross-section, the strength of products becomes higher. These are preferable structures as shown in U.S. Pat. No. 5,580,120, which is formed by one pipe but the sectional structure is complicated, U.S. Pat. Nos. 5,813,718, 5,820,202, Japanese Patent Application Laid-Open No. 244456/1996 and 086172/1997. In Japanese Patent Application Laid-Open No. 086172/1997, it indicates that, in particular, the necessity of high strengthened materials are required in the case of an one pipe structure.

Thus, in Japanese Patent Application Laid-Open No. 141368/1997 and No. 215059/1995 having only one pipe, improvement of strength is provided by welding. On the other hand, in U.S. Pat. No. 5,813,718, Japanese Patent Application Laid-Open No. 216684/1996, No. 244456/1996 and No. 086172/1997 made by annexed two pipes, a welding process is avoided to save accuracy after forming. Also, Japanese Patent Application Laid-Open No. 215059/1995 indicates that, in the case of avoiding the welding process, the rigidity is inferior when low strength materials are used. For this indication, however, there is a problem of sudden deterioration of strength by buckling even if high strength materials are used. Such sudden deterioration of strength is of great concern for providing sufficient safety for an actual collision from a side face.

From the above, the demands imposed on an automobile door reinforcing member are (1) miniaturizing and lightening of an reinforcing member in order to improve its installation space, (2) providing sufficient strength and rigidity when using low strength materials, and (3) preventing the occurrence of buckling.

SUMMARY OF THE INVENTION

Accordingly, the object of the present invention is to provide an automobile door reinforcing member consisting of twin pipes which shows sufficient strength and rigidity by a welding process with low strength materials being used.

The present invention is an automobile door reinforcing member consisting of the structure wherein a pair of pipes are formed from an original sheet material by: the joint surface being a middle portion of an original sheet in a width direction; the fold-back faces consist of the outer side faces of the pipes extending laterally from said joint surface, the outer wall faces extending from said outer side faces of the pipes, the inner side faces of the pipes extending from said outer wall faces, the inner wall faces extending from said fold-back faces to the joint surface, and the welding portions extending from said inner wall faces; forming these portions into lateral pipes by relatively bending the fold-back faces; folding boundary mark between the inner wall face and the welding portion into valley-shape; and putting the welding portions onto the joint surface situated at interval between said pipes; and then welding both of welding portions and the joint surface together to integrate the structure.

As a basic installation aspect, this automobile door reinforcing member is installed between an outer panel and an inner panel of an automobile door, with the joint surface and the outer side faces of pipes toward the outside of an automobile, and at the same time, the longitudinal direction of pipes is in front and back direction of an automobile.

The pipe is formed by folding the fold-back faces of an original sheet having welding portions at the inner wall faces extending from the folded-back faces. By being welded the welding portions and the joint surface are joined integrally to provide sufficient bond-strength of pipes with the joint surface. The welding portions and the joint surface are superposed, thus, a simple, cheap and continuous welding process is applicable such as spot-welding.

To improve the structural strength of a pipe itself, quenching of an intermediate portion of pipe is effective for an automobile door reinforcing member of the present invention. In practice, concerning stress variance put on pipes, the product consists of a beam structure with twin strong supporting pipes with installation parts formed to both ends of a product, and the quenching is performed on an intermediate portion of pipe.

Continuous roll forming can be used for the pipe forming process. Accordingly, an automobile door reinforcing member of the present invention is manufactured efficiently from the original sheet by being supplied continuously in sequential order from a roll forming process to a spot-welding process. Furthermore, at a cutting/separating process, the product is obtained by cutting and separating the tubular article in the product length, which completes the processing continuously after passing through the roll forming process and the spot-welding process. By necessity, the bending process that bends a product according to an automobile door and the quenching process are provided before a cutting/separating process. Despite these bending process and quenching process, productivity is not impaired by reason of the operation of these processes occur while passing through the spot-welding process continuously. The installation parts of a product are obtained after cutting and separating by crushing both ends of pipe. The installation part being formed by crushing pipe has a structure comprising two overlapped original sheets. This makes structural strength higher.

An absorption performance of impact as an automobile door reinforcing member is substantially influenced by shapes of the pipe cross-section. An automobile door reinforcing member of the present invention is formed to be; (1) a pipe consists of an approximately annular cross-section folding the outer side face of the pipe, the outer wall face and the inner side face of the pipe continuously in an arc-shape, (2) a pipe consists of an approximately oval cross-section obtained by bending the outer side face of the pipe and the inner side face of the pipe in an arc-shape, and by extending the outer wall face linearly from the outer side face of the pipe to the inner side face of the pipe, and further (3) a pipe consists of an approximately square cross-section obtained by bending the outer side face of the pipe in an arc-shape, and by extending the outer wall face and the inner side face of the pipe linearly. The cross-section of (1) is a basis of an automobile door reinforcing member of the present invention, and (2) is a cross-section adapting to the thickness of automobile door (a space between the outer panel and the inner panel) by extending the outer wall face. Further, an automobile door reinforcing member of the present invention has a cross-section as (3) to avoid deformation mutually caused by the outer side face of the pipe, the outer wall face and the inner side face of the pipe.

A structure of the joint surface is indented relatively against a form of the outer side face of the pipe. A performance of impact absorption by an automobile door reinforcing member depends on an amount of deformation occurring in the outer side face, the joint surface and the inner side face. If an amount of deformation of the inner side face of pipe is larger than the outer face of pipe, there is some fear of buckling as the impact absorption capacity deteriorates suddenly after a particular point of impact absorption. Therefore, the joint surface is indented relatively against the outer side face of the pipe, then, the central axis line of an automobile door reinforcing member is set toward an inner side face of the pipe. Accordingly, a small gap of an amount of deformation between the outer and the inner side faces of the pipe is achieved by improving the modulus of section of the inner side face of the pipe, then, restraining an amount of deformation of the inner side face of the pipe. A dent of the joint surface is simultaneously formed at the roll forming process serving as bend of the fold-back face. Further, a level difference of a dented joint surface functions as a kind of the rib, and, for example, it restrains generation of strain in said bending process.

DETAIL DESCRIPTION OF THE PREFERRED EMBODIMENTS

For convenience, applied configurations of the present invention are explained while referring to the attached drawings as follows.

Figure 1:
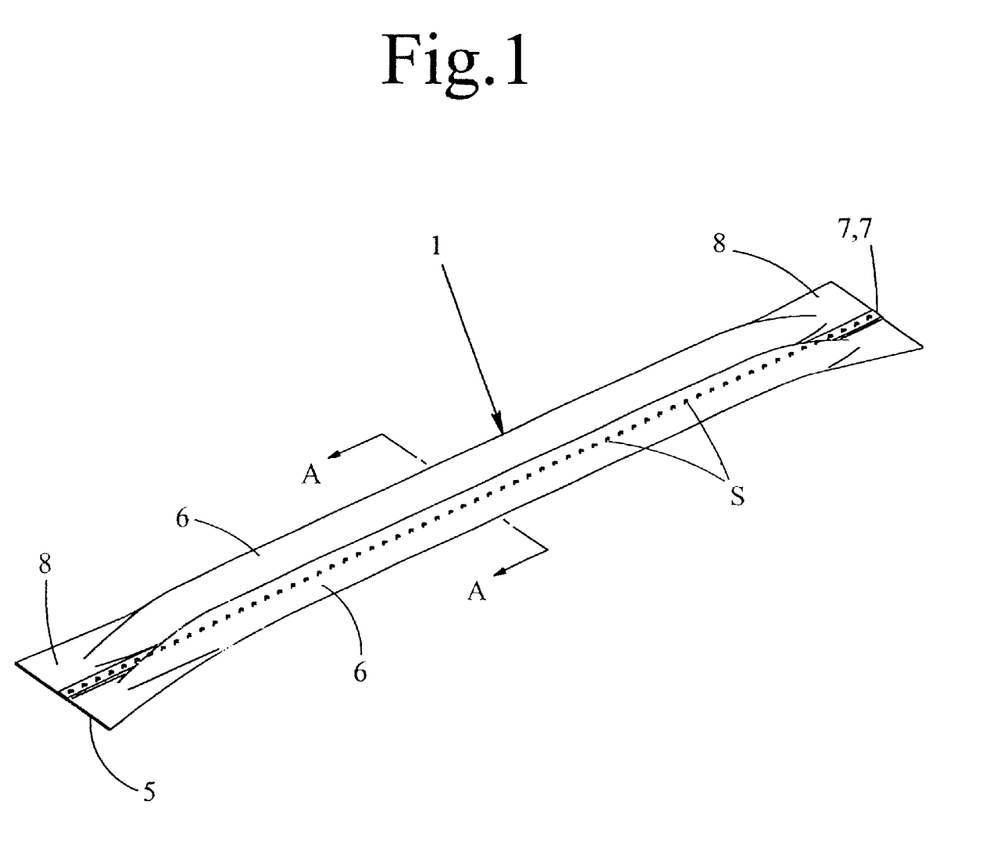
FIG. 1 is a perspective view showing the state which an automobile door reinforcing member 1 is laid upward a side of an internal surface of the automobile used in the present invention.
Figure 2:
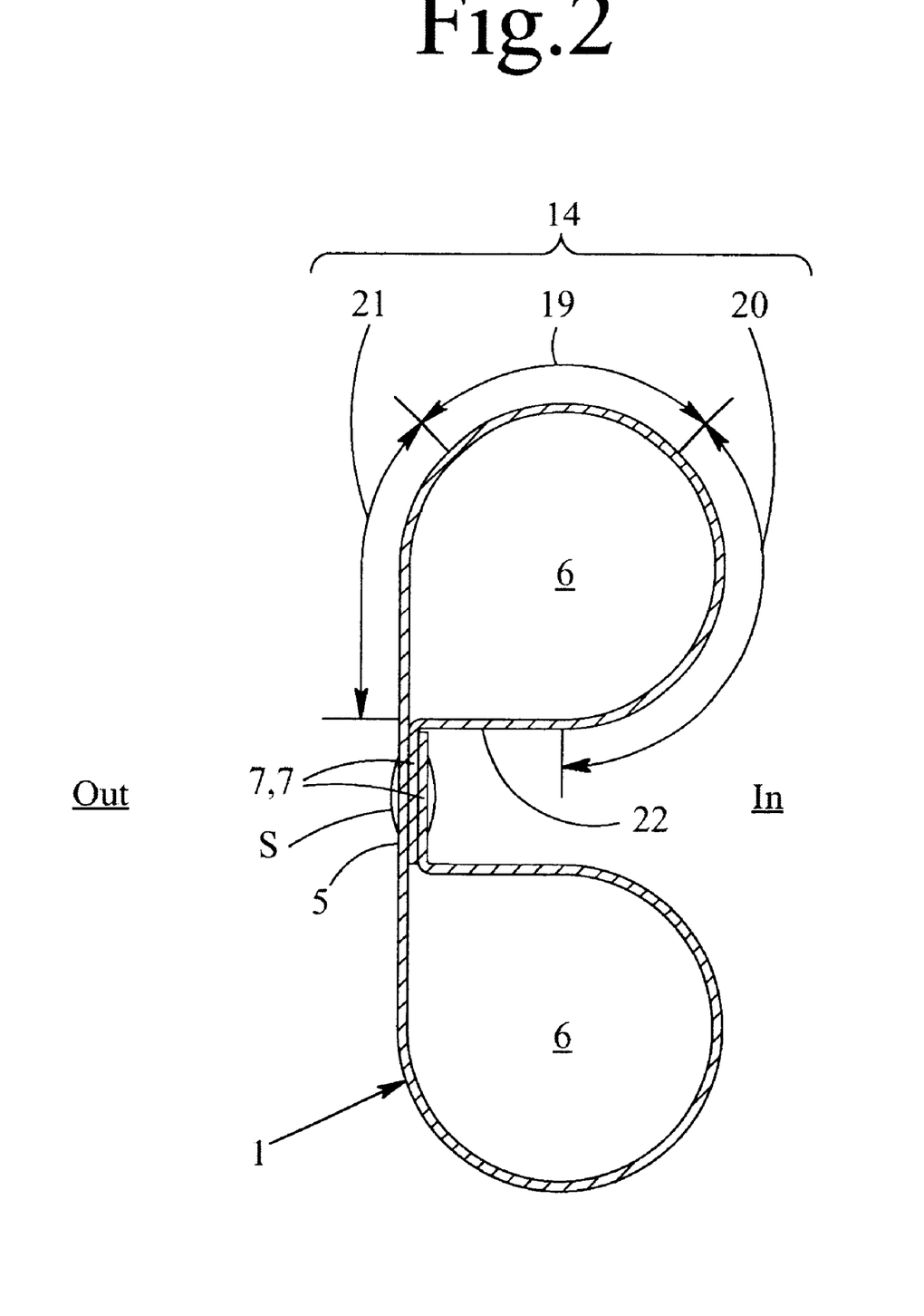
FIG. 2 is an enlarged view of A—A cross-section in FIG. 1.

As seen in FIG. 1 and FIG. 2, an automobile door reinforcing member 1 of the present invention is similar to conventional products visually. The welding portions 7,7 extending form both pipes 6,6 and the joint surface 5 are unified by spot-welding (spot-welding print S). An automobile door reinforcing member 1 which is cut off in every product length is formed with installation part 8,8 (a bolt hole etc, are not shown) by crushing its both ends. As is clear from the above, the automobile reinforcing member 1 has a layered structure (the welding portion 7—the welding portion 7—the joint surface 5) integrated by welding of the welding portion 7,7, being both folded margins of the original sheet, superposes to the joint surface 5. In addition, the structure consists of a part (shown as the fold-back face 14) of the original sheet bulged out to form the twin pipes 6,6, and, the fitting parts 8,8 layered at the both ends in the longitudinal direction of the product.

Figure 3:
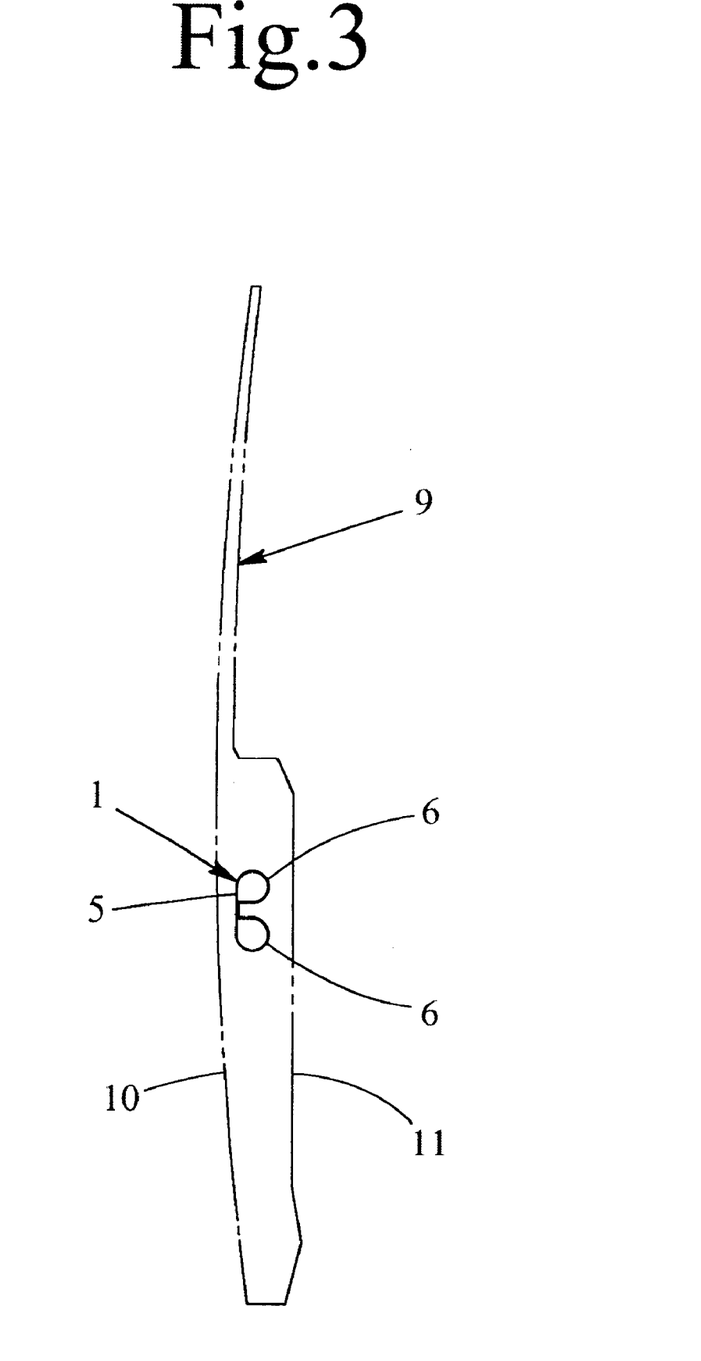
FIG. 3 is a sectional view showing an aspect of the basic installation according to A—A cross-section in FIG. 1.

For an attachment form, the cases where the joint surface 5 faces toward the outside or the inside of an automobile are possible. As shown in FIG. 3, a basic attachment form is the case where the joint surface 5 faces toward the outside of an automobile. In other words, in the space between the outer panel 10 and the inner panel 11 which form an automobile door, the joint surface 5 turns toward the outside of an automobile. At the same time, a longitudinal direction of the pipes 6 is in the longitudinal direction of an automobile. An external force of a side collision is absorbed by stretch (modification) of the pipes 6,6.

Figure 4:
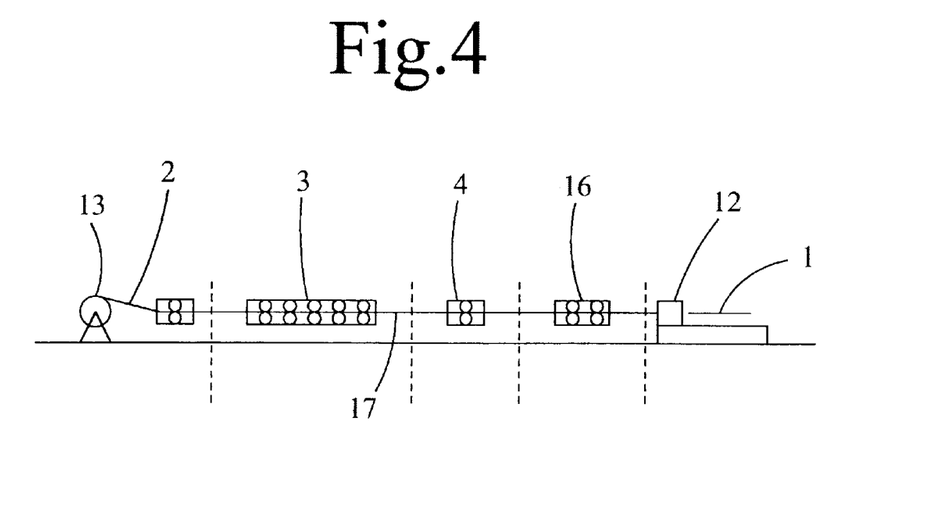
FIG. 4 is a block-diagram showing an example of production line for linear products.
Figure 5:
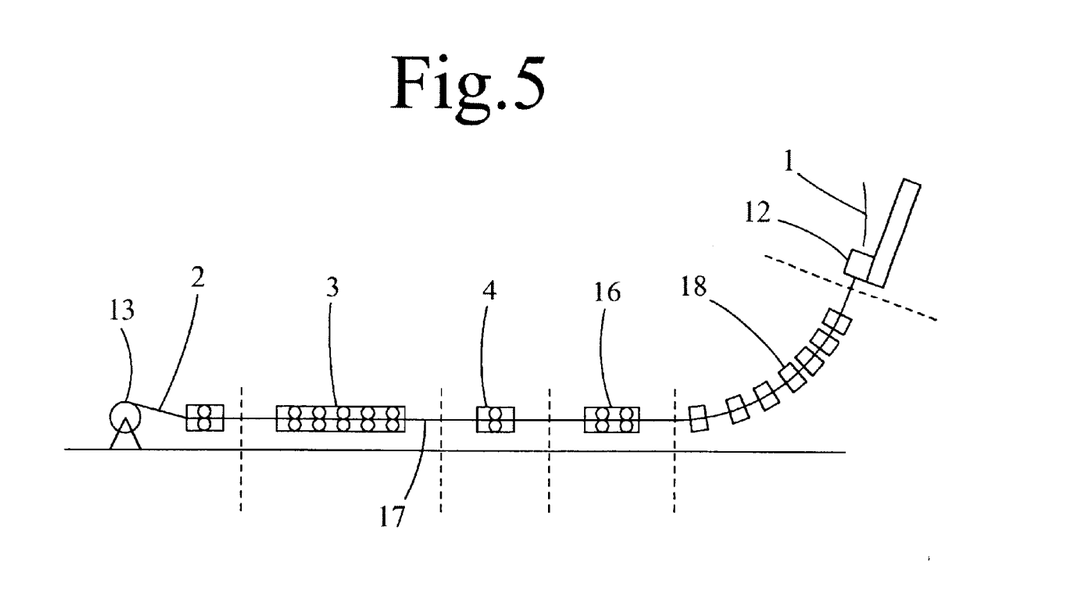
FIG. 5 is a block-diagram adding a bending process to the production line in FIG. 4.
Figure 6:
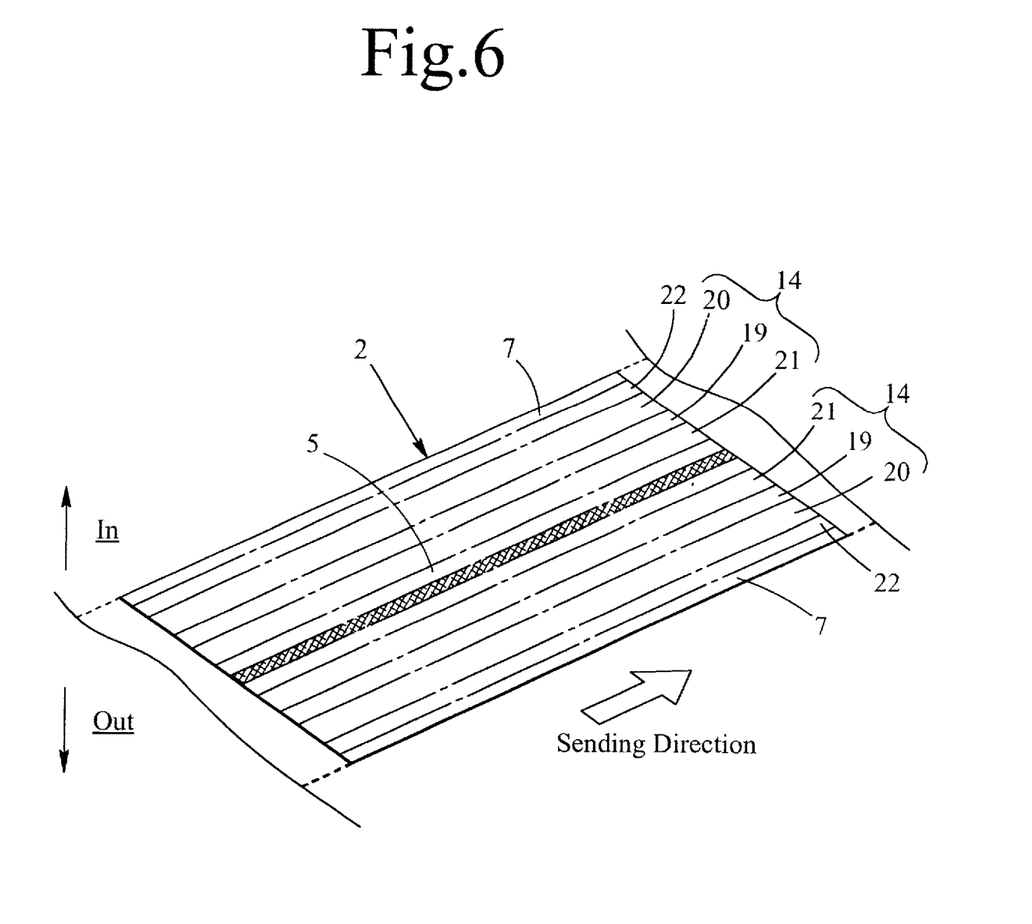
FIG. 6 is a perspective view showing the state of an original sheet driven by the production line.

The present invention produces the automobile door reinforcing member 1 continuously from the original sheet 2; completes processing through the roll forming process 3 and the spot-welding process 4, then, cuts and separates the product of a required length at the cutting/separating process 12. An example of a production line is shown in FIG. 4 and FIG. 5. The original sheet 2 (high-tensile rigid plate, for example) is supplied continuously by the uncoiler 13. As shown in FIG. 6, the original sheet 2 is a long sheet material which is very long in the product length. In FIG. 6, each of the boundary marks of the joint surface 5, the folded-back faces 14 (consisting of the outer side face 21 of the pipe, the outer wall face 19 and the inner side face 20 of the pipe), the inner wall face 22 and the welding portion 7 are illustrated with short dash line. A portion of the joint surface 5 where the welding portions 7,7 are superposed is illustrated with hatching. Further, at the basic attached form, "In" shown in FIG. 6 belongs to the inside of an automobile, on the other hand, "Out" belongs to the outside of an automobile. These illustrations are shown in the same way in FIG. 7 and FIG. 8.

Figure 7:
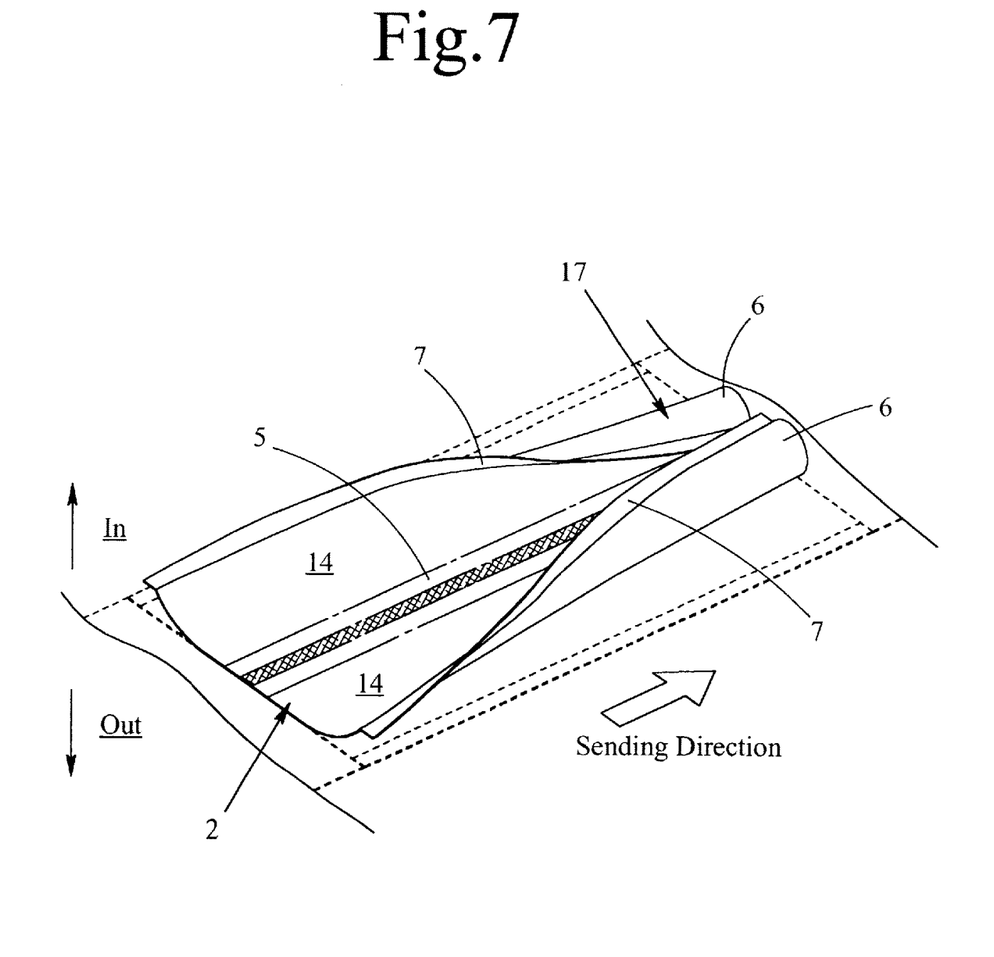
FIG. 7 is a perspective view explaining the roll forming process in the production line.

As shown in FIG. 7, the original sheet is formed into the pipe 6 by bending each of folded-back faces 14 (consisting of the outer side face 21 of the pipe, the outer wall face 19 and the inner side face 20 of the pipe) continuously at the roll forming process 3. A boundary mark between the inner wall face 22 extending from the inner side face 20 of the pipe and the welding portion 7 is bent into a valley by folding.

First, at the roll forming process 3, the welding portion 7 shown as the far side in FIG. 7 is fitted on to the joint surface 5, and subsequently, the other welding portion 7 shown as the near side is fitted on to them. The pipe 6 shown as approximately annular sectional view in FIG. 2 is formed by folding the outer side face 21 of the pipe, the outer wall face 19 and the inner side face 20 of the pipe gradually and equivalently. However, in the case of the approximately square sectional shaped pipe 6 for example, referring to FIG. 11, as hereinafter described, each of the amounts of bending are changed gradually. In the case to indent the joint surface 5, furthermore, the indent is formed in this roll forming process simultaneously or subsequently with forming of the pipe 6; then, the joint surface 5 is indented relatively against the shape of the outer side face 21 of the pipe 6.

Figure 8:
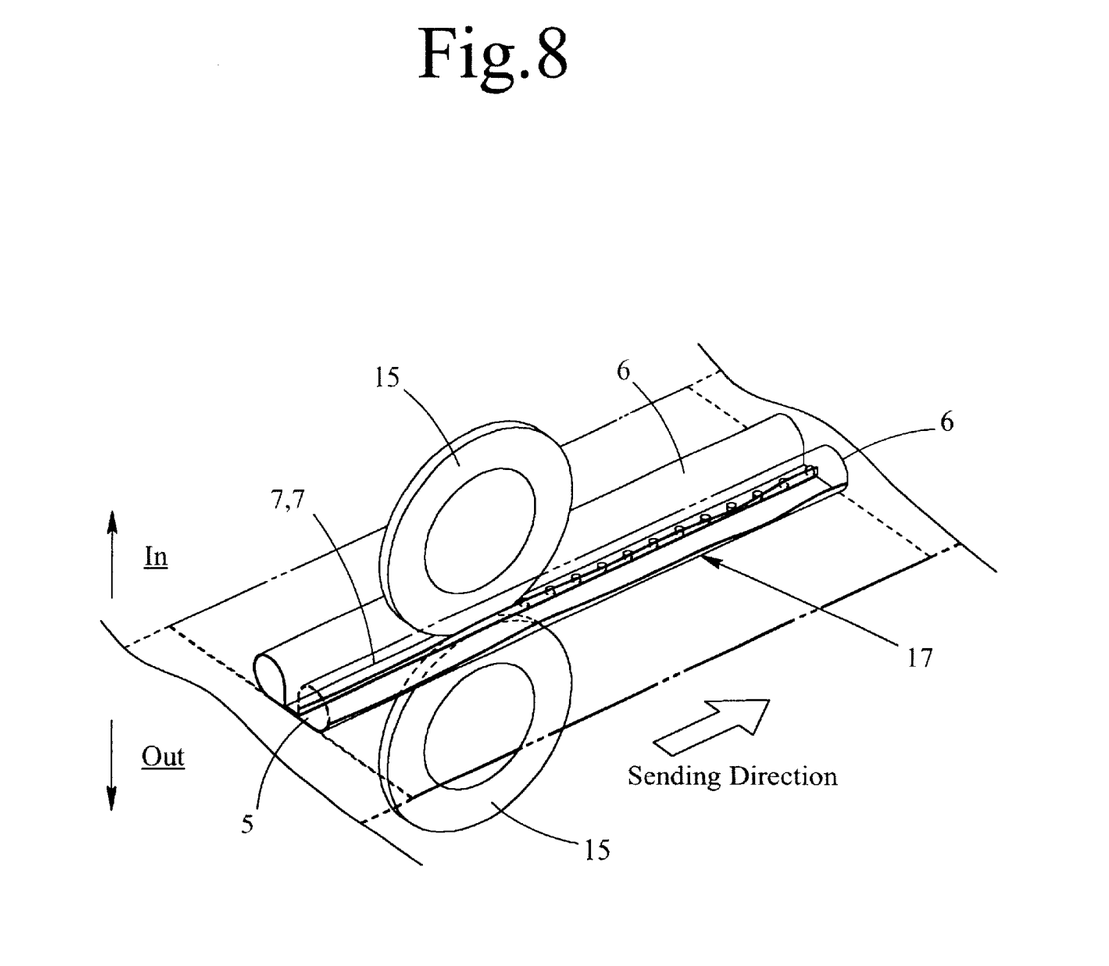
FIG. 8 is a perspective view explaining the spot-welding process in the production line.

As seen in FIG. 8, subsequently by the spot welding process 4 which is shown in FIGS. 3 and 4, the roller spot welding machines 15,15 are applied to both of the welding portions 7,7 onto the joint surface 5 from above and below so as to integrate the welding portion 7,7 and the joint surface 5 successively by spot-welding. In this example, after the spot welding process 4, the processing of the tubular article 17 is completed through a strain removal process 16. A quenching process is provided before or after the strain removal process so that improvement of structural strength of the pipe 6 is achieved.

Further, a cutting/separating process for every product length is selectively applied: (a) in the case of the straightened products, shown as FIG. 4, it is supplied to the cutting/separating process 12 directly; (b) in the case of the curved products, shown as FIG. 5, it is supplied to the cutting/separating process 12 through the bending process 18. In the end, the products are obtained by installing bolt mounting hole(s) to the fitting parts 8,8 formed by crushing both edges of the pipes 6,6 of each automobile door reinforcing members 1 at another production line or device (see FIG. 1).

Others of the above-mentioned illustration, an automobile door reinforcing member 1 of the present invention can adopt various kind of structures within the limit that is possible to secure productivity of the roll forming process and the spot-welding process.

Figure 9:
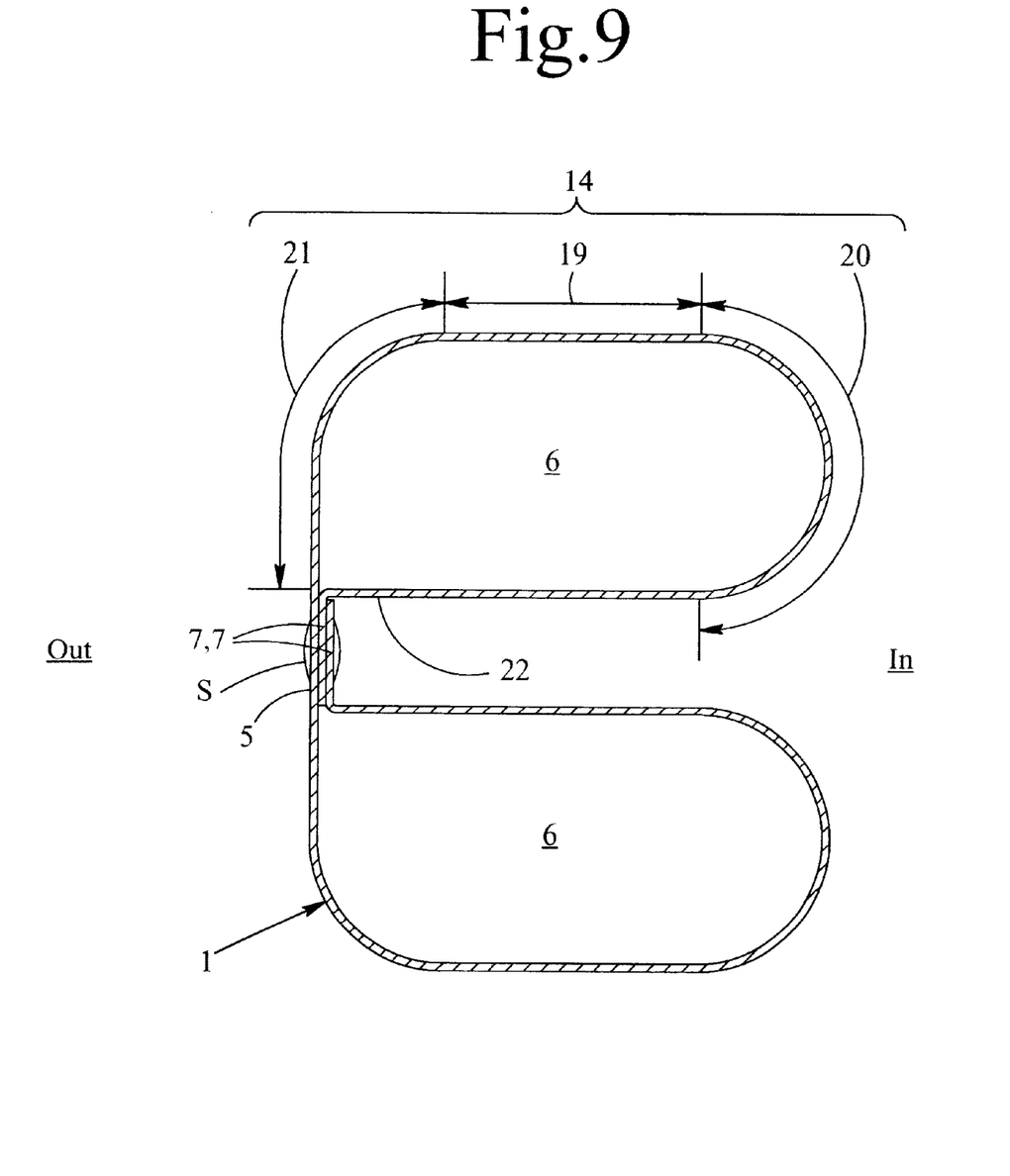
FIG. 9 is a grossly enlarged sectional view showing an automobile door reinforcing member which consisted of oval sectional pipes.

The space between the outer panel 10 and the inner panel 11 (see FIG. 3) depends on the model of the automobiles. In this case, as shown in FIG. 9, the approximately oval sectional pipes 6,6 is formed by extending the outer wall face linearly. Adjusting the oval shape of pipes depends on the thickness of an automobile door reinforcing member required.

Figure 10:
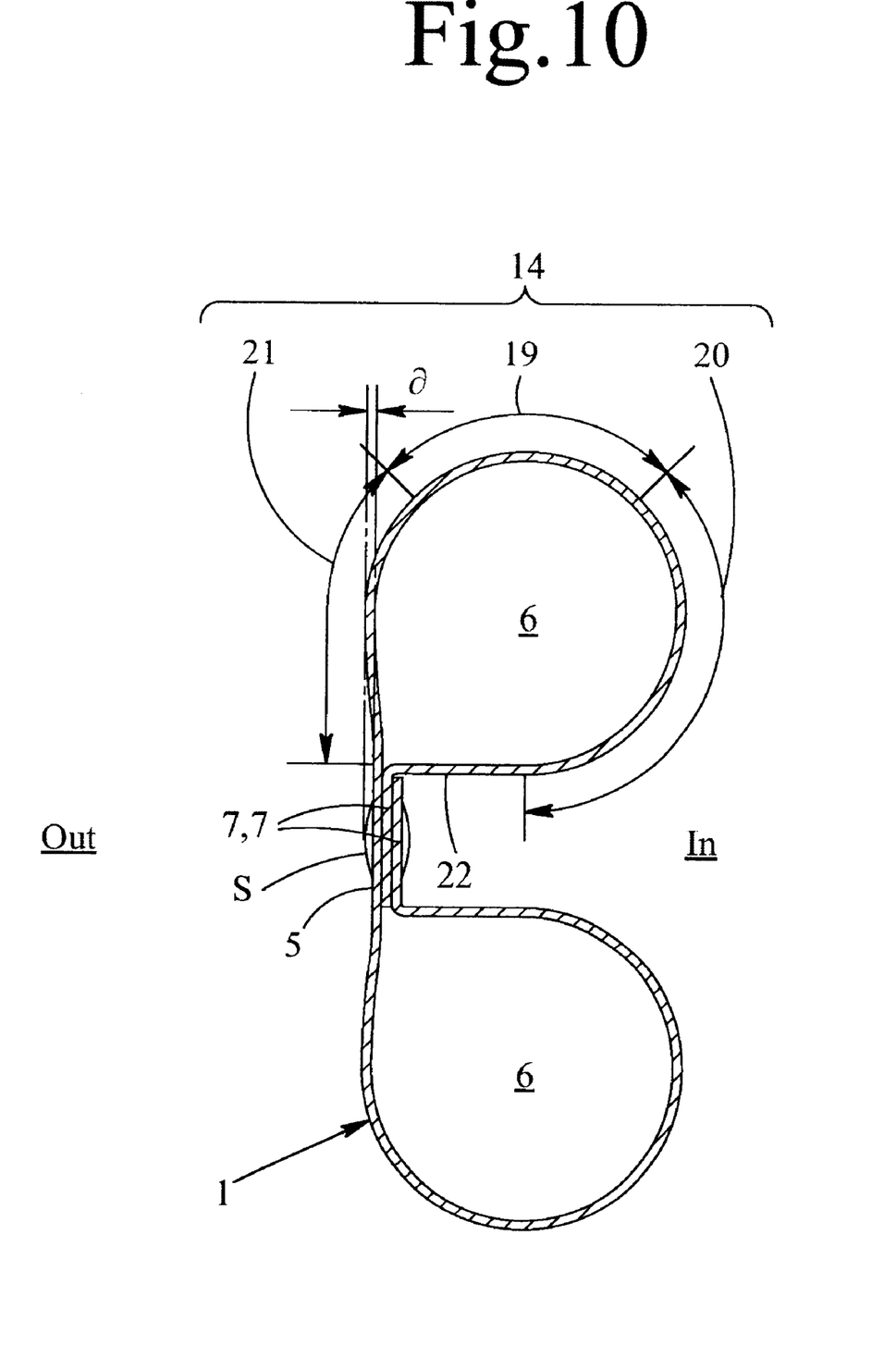
FIG. 10 is a grossly enlarged sectional view showing an automobile door reinforcing member with an indented a joint surface.

Further, as shown in FIG. 10, the joint surface 5 is indented relatively against the outer side face 21 of the pipe so as to prevent buckling of an automobile door reinforcing member 1 and to improve impact absorption performance. The indent displaces the central axis line G toward the inner side of automobiles, and achieves a small gap for the amount of deformation between the outer side face 21 and the inner side face 20 of the pipes. A small quantity of indent δ is sufficient.

Figure 11:
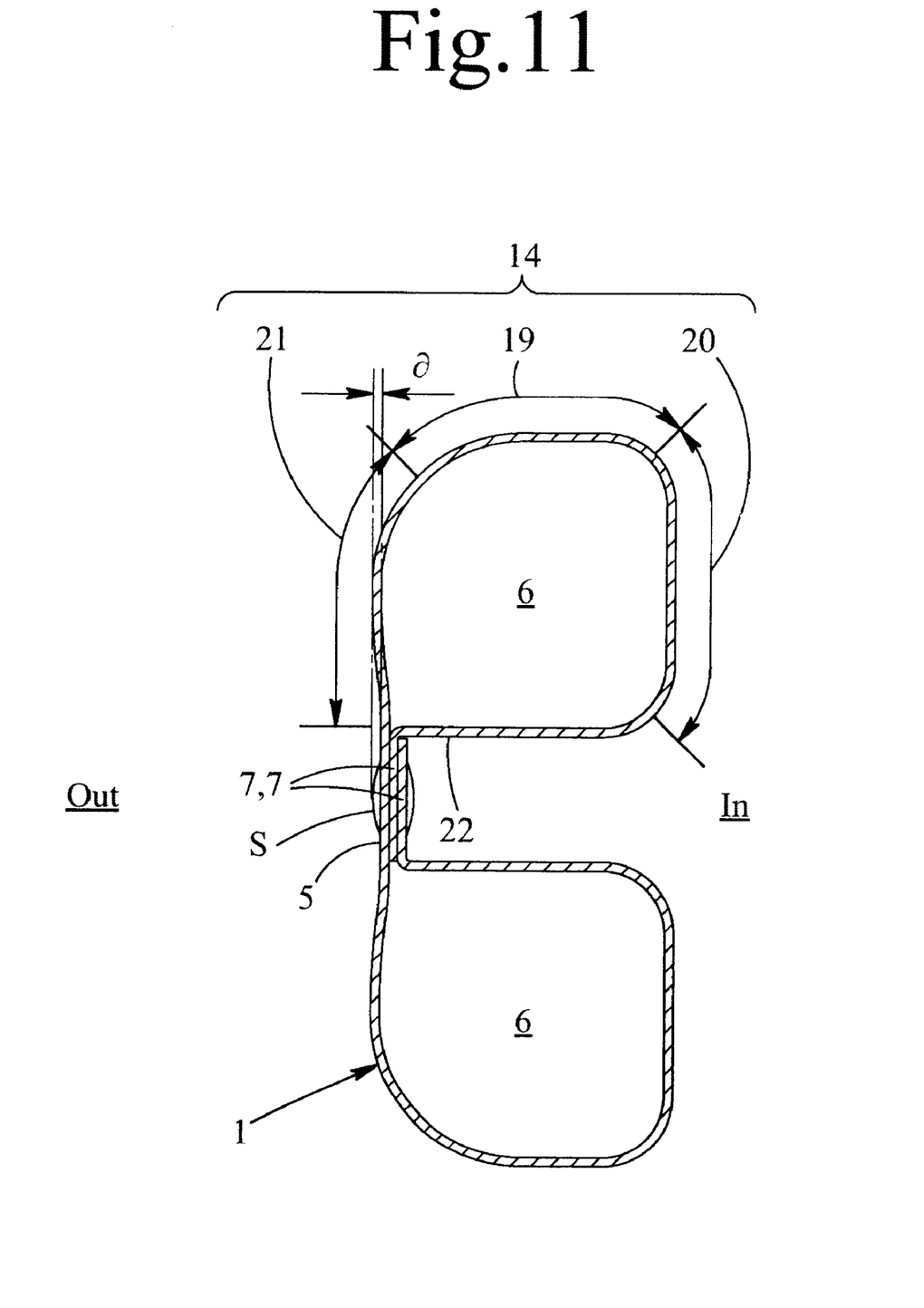
FIG. 11 is a grossly enlarged sectional view showing an automobile door reinforcing member which consisted of pipes with approximately square cross-section.
Figure 12:
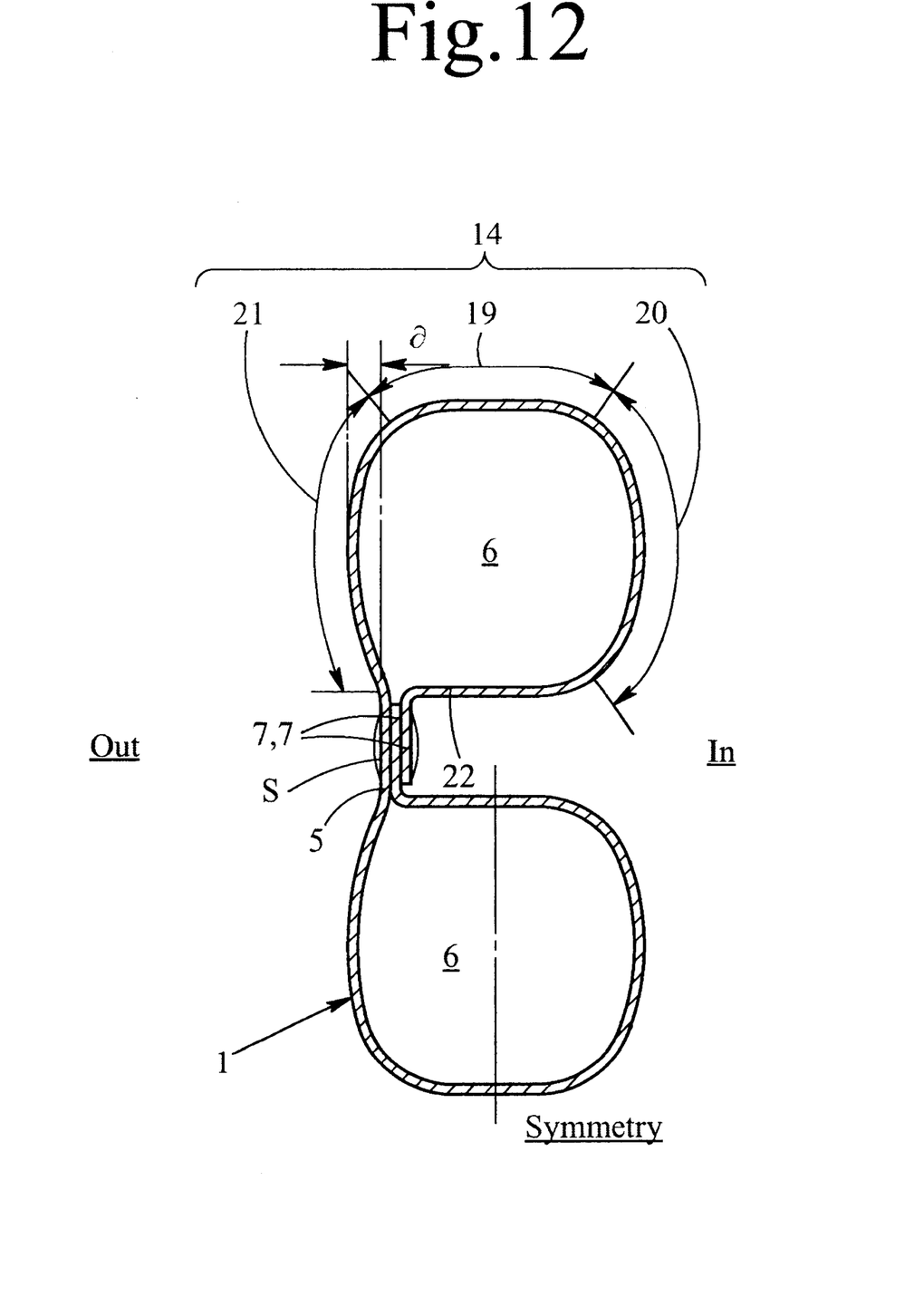
FIG. 12 is a grossly enlarged sectional view showing the other example of an automobile door reinforcing member which consisted of pipes with approximately square cross-section.

As seen in FIG. 11, in order to prevent buckling of the pipe 6, each cross-section of the pipes 6,6 is closed to form an approximately square cross-section. An approximately square sectional pipe 6 obtains high performance to absorb impact by means of its structure to prevent buckling. Besides, as seen in FIG. 12, an approximately square cross-section of the pipe 6 is preferably formed symmetrically so that the different amount of stretch between the outer side face 21 and the inner side face 21 of the pipe is decreased. This pipe 6, in addition, enhances structural strength by means of the inner side face 20 of the pipe, the outer side face 21 of the pipe and the outer side face 19. Amount of indent 6 to the joint surface 5 depends on the bulge of the inner side face 20 of the pipe relatively.

As seen from the above, an automobile door reinforcing member of the present invention has a simple structure and the following advantages as compared to the current products are achieved. First, (1) the simple structure miniaturizes the products. However, in spite of miniaturizing, necessary and sufficient performance is obtained by the structure of the present invention. In other words, (2) low strength materials are usable as a result of structure of the present invention which is higher in strength and rigidity compared to a current automobile door reinforcing member. The high strength and rigidity are achieved by the complete closed-structure obtaining as a result of welding the pipe formed in the folded-back faces. It is sufficient for the welding to be continuous spot-welding, thus, a smart production efficiency provides the continuous production using a roll forming. Besides, the pipe exercises high strength and rigidity relatively to the fitting part as a result of quenching of the intermediate part except the fitting part, to thus obtain superior performance to absorb side impact.

What is claimed is:

1. An automobile door reinforcing member comprising of a structure wherein a pair of separate, parallel pipes are formed relatively from an original sheet, said reinforcing member comprising:

a joint surface provided in a middle portion of the original sheet in a width direction, fold-back faces formed by outer side faces of the pipes extending laterally from said joint surface, outer wall faces extending from said outer side faces of the pipes, and inner side faces of the pipes extending from said outer wall faces, inner wall faces extending from said fold-back faces to the joint surface, welding portions extending from said inner wall faces, lateral pipes formed relatively by bending said fold-back faces, and a valley between said inner wall faces and said welding portions by putting the welding portions onto said joint surface to form an interval between said pipes, and wherein the welding portions and said joint surface are welded together to form an integrated structure.

2. An automobile door reinforcing member according to claim 1, wherein an increased structural strength portion is provided at an intermediate part in a longitudinal direction of said pipes.

3. An automobile door reinforcing member according to claim 1, wherein each of said pipes has an approximately annular cross-section.

4. An automobile door reinforcing member according to claim 1, wherein each of said pipes has an approximately oval cross-section.

5. An automobile door reinforcing member according to claim 1, wherein each of said pipes has an to approximately square cross-section.

6. An automobile door reinforcing member according to claim 1, wherein said joint surface is indented relatively against a shape of said outer side faces of the pipes.

* * * * *